United States Patent
Yap et al.

(10) Patent No.: US 7,181,093 B2
(45) Date of Patent: Feb. 20, 2007

(54) TUNABLE RF-LIGHTWAVE MODULATOR

(75) Inventors: Daniel Yap, Newbury Park, CA (US); Peter Petre, Oak Park, CA (US); Joseph S. Colburn, Los Angeles, CA (US)

(73) Assignee: HRL Laboratories, LLC, Malibu, CA (US)

( * ) Notice: Subject to any disclaimer, the term of this patent is extended or adjusted under 35 U.S.C. 154(b) by 400 days.

(21) Appl. No.: 10/735,070

(22) Filed: Dec. 12, 2003

(65) Prior Publication Data

US 2004/0202395 A1    Oct. 14, 2004

Related U.S. Application Data

(60) Provisional application No. 60/461,894, filed on Apr. 10, 2003.

(51) Int. Cl.
*G02F 1/01* (2006.01)
*G02F 1/035* (2006.01)
*G02B 6/12* (2006.01)

(52) U.S. Cl. ............... 385/1; 385/2; 385/14; 385/40

(58) Field of Classification Search .............. None
See application file for complete search history.

(56) References Cited

U.S. PATENT DOCUMENTS

| 5,166,991 | A | * | 11/1992 | Jaeger et al. ............... 385/16 |
| 5,459,800 | A | * | 10/1995 | Enokihara et al. ........... 385/3 |
| 5,787,211 | A | * | 7/1998 | Gopalakrishnan ............ 385/2 |
| 6,504,640 | B2 | * | 1/2003 | Gopalakrishnan .......... 359/245 |

OTHER PUBLICATIONS

Hong, J., et al., "Theory and Experiment of Novel Microstrip Slow-Wave Open-Loop Resonator Filters," *IEEE Transactions on Microwave Theory and Techniques*, vol. 45, No. 12, pp. 2358-2365 (Dec. 1997).

(Continued)

*Primary Examiner*—Sung Pak
*Assistant Examiner*—Omar Rojas
(74) *Attorney, Agent, or Firm*—Ladas & Parry LLP

(57) ABSTRACT

The present invention provides a RF-lightwave modulator with improved efficiency by making use of a broken loop resonator having a gap therein. In the present invention a RF input signal is coupled into a broken loop resonator, thereby producing a RF output signal. An optical modulator connected across the gap receives the RF output signal and modulates a lightwave with the RF output signal to produce a RF modulated lightwave. Because the optical modulator is connected across the gap in the broken loop resonator, the voltage of the RF output signal applied to the optical modulator will be greater than the voltage of the RF input signal applied to the broken loop resonator.

63 Claims, 7 Drawing Sheets

OTHER PUBLICATIONS

Izutsu, M., "Photonic Technologies for Millimeter-Wave Engineering ," *IEEE Digest*, pp. 125-128 (1998), no month.

Kawanishi, T., et al., "Design of LiNbO$_3$ Optical Modulator with an Asymmetric Resonant Structure," *IEICE Trans. Electron.*, vol. E85-C, No. 1, pp. 150-155 (Jan. 2002).

Kawanishi, T., et al., "LiNbO$_3$ Resonant-Type Optical Modulator with Double-Stub Structure," *Electronics Letters*, vol. 37, No. 20, pp. 1244-1246 (Sep. 27, 2001).

Krähenbühl, R., et al., "Investigations on Short-Path-Length High-Speed Optical Modulators in LiNbO$_3$ with Resonant-Type Electrodes," *Journal of Lightwave Technology*, vol. 19, No. 9, pp. 1287-1297 (Sep. 2001).

Sagawa, M., et al., "Miniaturized Hairpin Resonator Filters and Their Application to Receiver Front-End MIC's," *IEEE Transactions on Microwave Theory and Techniques*, vol. 37, No. 12, pp. 1991-1997 (Dec. 1989).

* cited by examiner

TUNABLE RF-LIGHTWAVE MODULATOR

CROSS-REFERENCE TO RELATED APPLICATIONS

The present application is related to and claims the benefit of U.S. Provisional Application No. 60/461,894, filed on Apr. 10, 2003, and titled "Tunable RF-Lightwave Modulator." The disclosure of U.S. Provisional Application No. 60/461,894 is incorporated by reference herein in its entirety.

FIELD

The present invention relates to a RF-lightwave modulator. More specifically, the present invention relates to a tunable RF-lightwave modulator in which an optical modulator is driven by a broken loop resonator having a gap therein, thereby helping to maximize the voltage applied to the optical modulator.

BACKGROUND

RF-lightwave links are commonly used to carry RF signals on optical fiber over long distances with less interference than conventional RF cables or waveguides. In order to carry the RF signals over optical fiber, an optical modulator is used to modulate a lightwave with the desired RF signal to be carried. The usefulness of RF-lightwave links depends largely on the net signal gain or loss of the link. One technique for improving the gain is to provide an amplifier in the link. However, amplifiers are active elements that introduce noise into the system. Another approach is to provide an impedance matching circuit directly between the RF signal and the optical modulator. However, using an impedance matching circuit generally only improves the gain by about 3 dB.

Another passive approach for providing improved gain involves using a modulator electrode that is also a RF resonator. However, in such a technique the lightwave is carried by an optical waveguide which is part of an optical modulator that is coupled to many points along the length of the resonator. As a result, the voltage driving the modulation is the average voltage over the entire resonator rather than the peak voltages found at specific locations on the resonator. Such in-line resonators are discussed in:

1. Digest 1997 IEEE, Topical Symposium on Millimeter Waves, pp. 125–128 (1998).

Previous in-line RF resonators that act as modulator electrodes to drive optical modulators are discussed in:

2. Electronics Letters, vol. 37, no. 20, pp. 1244–1246 (2001);

3. IEICE Trans. Electron., vol. E85-C, no. 1, pp. 150–155 (2002);

4. J. Lightwave Technology, vol. 19, no. 9, pp. 1287–1297 (2001).

These in-line transmission-line resonators were typically T-shaped structures. In such resonators, the top of the T is a resonator that would receive a RF input signal through the leg of the T. The entire top of the T comprises the modulation electrode. The total length of the top of the T defines the effective length of the resonator, which in turn determines the modulation voltage applied to the lightwave in the optical modulator. The total length of the T-top also determines the resonance frequency of the resonator, and thus the passband frequency of the optical modulator. When the T-shaped resonator is driven by the RF input signal, a standing-wave voltage pattern is established across the T. The optical modulator whose optical waveguide is electrically coupled to the entire length of the T-top effectively receives an equivalent of the standing-wave voltage pattern across the top of the T. If the ends of the T-top are electrically short circuited to a ground plane, the maximum voltage in the standing-wave voltage pattern will appear mid-way between the ends of the T-top and the leg of the T. If the ends of the T-top are an electrically open circuit with respect to the ground plane, then the maximum voltage in the standing-wave voltage pattern will appear at the ends of the T-top. In either situation, the standing-wave voltage pattern across the T-top is not uniform. The non-uniform voltage pattern across the T means that the average or cumulative voltage driving the optical modulator is lower than the maximum voltage on the T in the standing-wave voltage pattern.

There have been attempts to improve the voltage distribution across the T. In these attempts, various portions of the T were bent so that a smaller portion of the T-top is coupled to the optical waveguide to be modulated and acts as the modulation electrode of the modulator. This improved the cumulative or average voltage across the region that was being used to drive the optical modulator. For example, if the T has open circuits at the ends of the T-top, the ends of the T-top were bent in a direction orthogonal to the T-top so that only the unbent portion of the T-top was coupled to the optical waveguide to be modulated. For a T whose ends are short-circuited, the lower portion of the leg of the T would be bent orthogonally to the remaining portion of the T-leg. Thus, the portions of the T-top near its ends would be coupled to the optical waveguide to be modulated. These techniques would help decrease the area of the resonator having low standing-wave voltage that is coupled to the optical waveguide to be modulated, thereby helping to increase the average voltage being used to drive the optical modulator. The gain in voltage using these techniques was around 10–12 dB. Nevertheless, the standing-wave voltage pattern of the portion of the T-top driving the optical modulator was still substantially non-uniform. In these and the previous modulators the resonator is in-line with the propagation direction of the optical waveguide. The lightwave in the optical waveguide is thus coupled to many points along the length of the selected portion of the resonator. As a result, these techniques were not able to drive the optical modulator with the maximum voltage found in the standing-wave voltage pattern across the T.

Other types of resonators have also been used in the RF industry but have not been applied to optical modulators. Broken loop resonators have been utilized in the RF industry, but only for use as a RF filter. These resonators were used to reduce the resonant frequency by placing a capacitive load across the gap, but not as a drive source for a modulator. Such a technique is discussed in:

5. IEEE Trans. Microwave Theory and Techniques, vol. 45, no. 12, pp. 2358–2365 (1997); and 6. IEEE Trans. Microwave Theory and Techniques, vol. 37, no. 12, pp. 1991–1997 (1989).

SUMMARY

The present invention described herein helps to solve the aforementioned problems by providing a RF-lightwave modulator in which an optical modulator is connected across the gap of a broken loop resonator. By connecting the optical modulator across the gap, the voltage driving the optical modulator is the peak voltage found in the broken loop resonator.

The present invention provides a RF-lightwave modulator that improves the gain of the RF-lightwave modulator by using a passive element. The present invention comprises a broken loop resonator having a gap therein. An input provides a RF input signal to drive the broken loop resonator, thereby generating a RF output signal. An optical modulator, which is connected across the gap in the broken loop resonator, receives the RF output signal and uses the RF output signal to modulate a lightwave, thereby generating a RF-modulated lightwave.

DETAILED DESCRIPTION

The present invention will now be described more fully hereinafter with reference to the accompanying drawings, in which preferred embodiments of the invention are shown. This invention may be embodied in many different forms and should not be construed as limited to the embodiments set forth herein.

Figure 1:
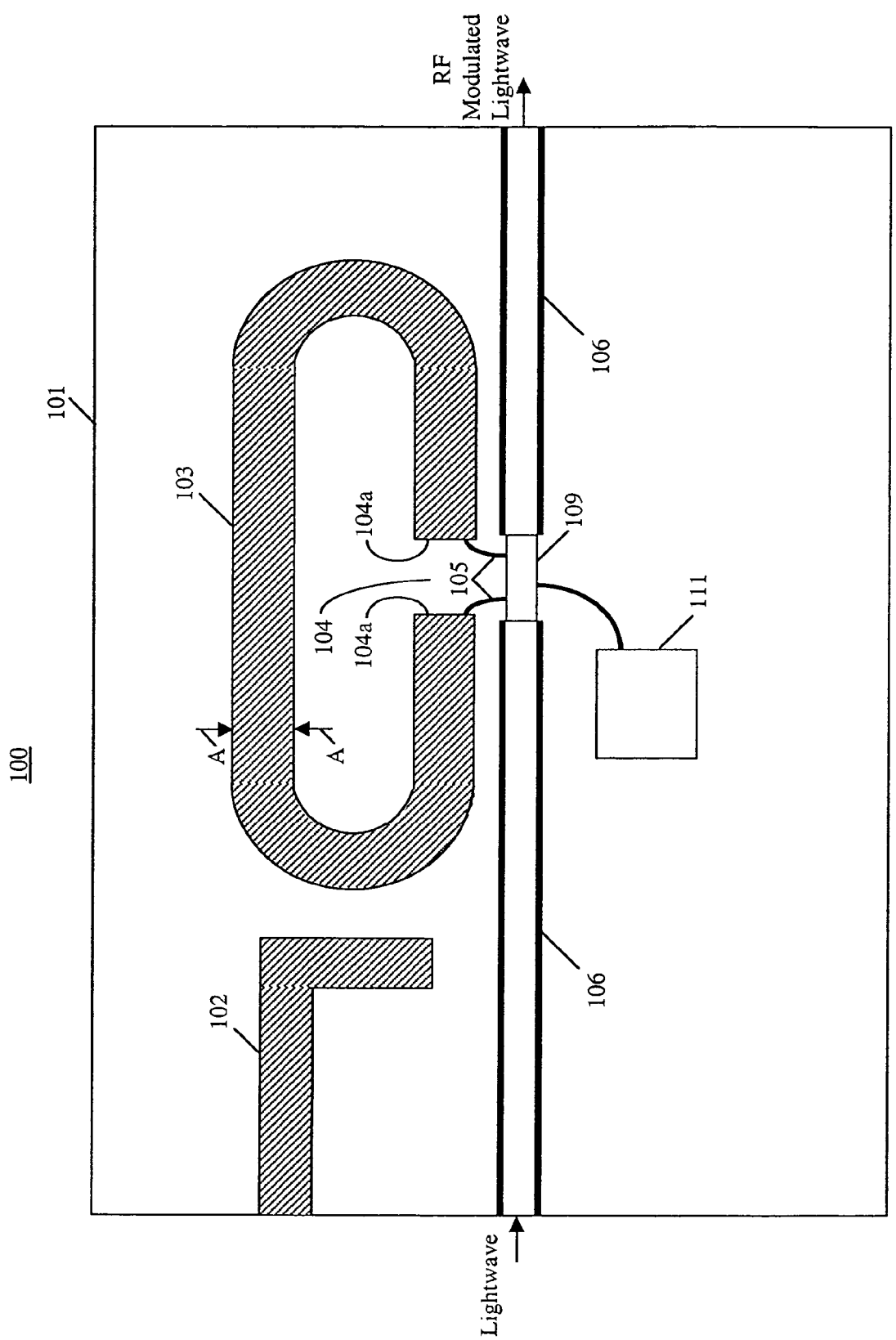
FIG. 1 shows a RF lightwave modulator according to a first embodiment of the present invention.

The present invention according to a first embodiment will now be described with reference to FIGS. 1–2. Shown in FIG. 1 is a RF-lightwave modulator 100 according to the present invention. The RF-lightwave modulator 100 is provided on a substrate 101, typically comprising a high-resistivity material such as $LiNbO_3$, GaAs, Si, or alumina, on which an input 102, broken loop resonator 103, optical modulator 109, and bias control circuit 111 are disposed. In the present invention, a RF input signal is placed on the input 102 to drive the broken loop resonator 103. The broken loop resonator 103 produces a RF output signal that is coupled into the optical modulator 109. The optical modulator 109 also receives a lightwave from an external source. The optical modulator 109 then uses the RF output signal to modulate the lightwave, thereby producing a RF modulated lightwave. The bias control circuit 111 is used to adjust the operating point of the optical modulator 109. The aforementioned features of the RF-lightwave modulator 100 will now be discussed in more detail.

As shown in FIG. 1, the RF-lightwave modulator 100 includes an input 102. The input 102 is preferably fabricated on the substrate 101 using micro-strip transmission line, however other RF transmission line structures such as symmetric or asymmetric coplanar waveguides, or coplanar strips can be used equally as well. The input 102 receives a RF input signal from an external source such as an oscillator (not shown). For the embodiment shown in FIG. 1, the RF input signal is coupled into the broken loop resonator 103 as a voltage. In such an embodiment, the input 102 generally has an impedance of about 50 ohms, and the broken loop resonator 103 generally has a characteristic impedance of about 50 ohms. Alternatively, the input 102 and the broken loop resonator 103 can have characteristic impedances that match the impedance of the optical modulator 109 at a frequency of interest.

The broken loop resonator 103 can be fabricated on the substrate 101 using micro-strip transmission line, however other RF transmission line structures such as symmetric or asymmetric coplanar waveguides, or coplanar strips can be used equally as well. The broken loop resonator 103 preferably comprises high resistivity material, a dielectric material or ceramic such as GaAs, Si, $LiNbO_3$, or alumina. The broken loop resonator 103 can be fabricated directly on the substrate 101, or can be mounted independently on the substrate 101. The broken loop resonator 103 contains a gap 104, to which the optical modulator 109 is electrically coupled across, using electrical wires 105. The ends 104a of the broken loop resonator 103 are connected by the wires 105 to the optical modulator 109 and function as electrodes for the optical modulator 109. The broken loop resonator 103 typically has an overall length equal to about ½ the wavelength of its resonant frequency, and a transmission line width (see arrows A in FIG. 1) which is substantially smaller than about ½ the wavelength of the center frequency in the passband.

When driven by the RF input signal, the broken loop resonator 103 produces a corresponding RF output signal having a distinct passband. The passband of the RF output signal can be adjusted, for example, by adjusting the dimensional parameters of the broken loop resonator 103. Adjusting the passband of the RF output signal could then be used to adjust the passband of the RF modulated lightwave (discussed later). In addition, the center frequency of the RF modulated lightwave can be adjusted for example, by adjusting the overall length of the broken loop resonator 103 or the width of the gap 104. Adjusting the width of the gap 104 or the transmission line width of the broken loop resonator 103 changes the capacitance of the gap 104. Also, by adjusting the attenuation of the broken loop resonator 103, the voltage of the RF output signal applied to the optical modulator 109 can be adjusted. Adjusting the voltage applied to the optical modulator 109 can be used to adjust the ratio of RF to DC components in the RF modulated lightwave. Those skilled in the art will realize that the desired frequency characteristics of the RF modulated lightwave can be adjusted by varying the physical and dimensional parameters of the broken loop resonator 103.

The optical modulator 109 is electrically connected across the gap 104 with electrical wires 105 coupled to the ends 104a to receive the RF output signal, as shown in FIG. 1. Because the optical modulator 109 is connected across the gap 104, the voltage of the RF output signal coupled to the optical modulator 109 is the peak voltage found in the broken loop resonator 103 and is greater than the voltage of the RF input signal coupled into the broken loop resonator 103. The optical modulator 109 receives a lightwave from a source (not shown) via optical fiber 106, for example. Alternatively, a series of optical lenses (not shown) could also be used to couple the light into the optical modulator 109. Preferably, the intensity, as well as the wavelength of the lightwave is tunable. If the optical modulator 109 is an electroabsorption modulator type (discussed later), adjusting the intensity and wavelength of the lightwave can be used to adjust the passband of the RF modulated lightwave. If optical fiber 106 is used, a groove (not shown) is preferably fabricated in the substrate 101 to assist in positioning and holding the optical fiber 106. The optical modulator 109 uses the RF output signal to modulate the lightwave, thereby generating a RF modulated lightwave. The RF modulated lightwave is then coupled from the optical modulator 109 through the additional optical fiber 106. Alternatively, a series of optical lenses (not shown) could also be used to couple the light out from the optical modulator 109. In addition, a bias circuit 111 is also preferably provided. The bias circuit 111 is electrically coupled to the optical modulator 109 and is used to provide a DC bias voltage (discussed later) to the optical modulator 109.

The optical modulator 109 of the present invention could, for example, be of an electroabsorption modulator (EAM) type, waveguide phase modulator type, or electro-optic type. When the optical modulator 109 is of an EAM type, it may comprise a material such as GaAs or InGaAs, or InGaAsP. If the broken loop resonator 103 and optical modulator 109 comprise the same material as the substrate 101, the optical modulator 109 can be fabricated directly on the substrate 101. However, if the broken loop resonator 103 and optical modulator 109 comprise different materials, the optical modulator 109 can be mounted independently onto the substrate 101. If the optical modulator 109 is an electro-optic type modulator, it can be an intensity modulator or an amplitude modulator. A Mach-Zender modulator and a directional-coupler modulator are also known configurations of electro-optic modulators.

Figure 2:
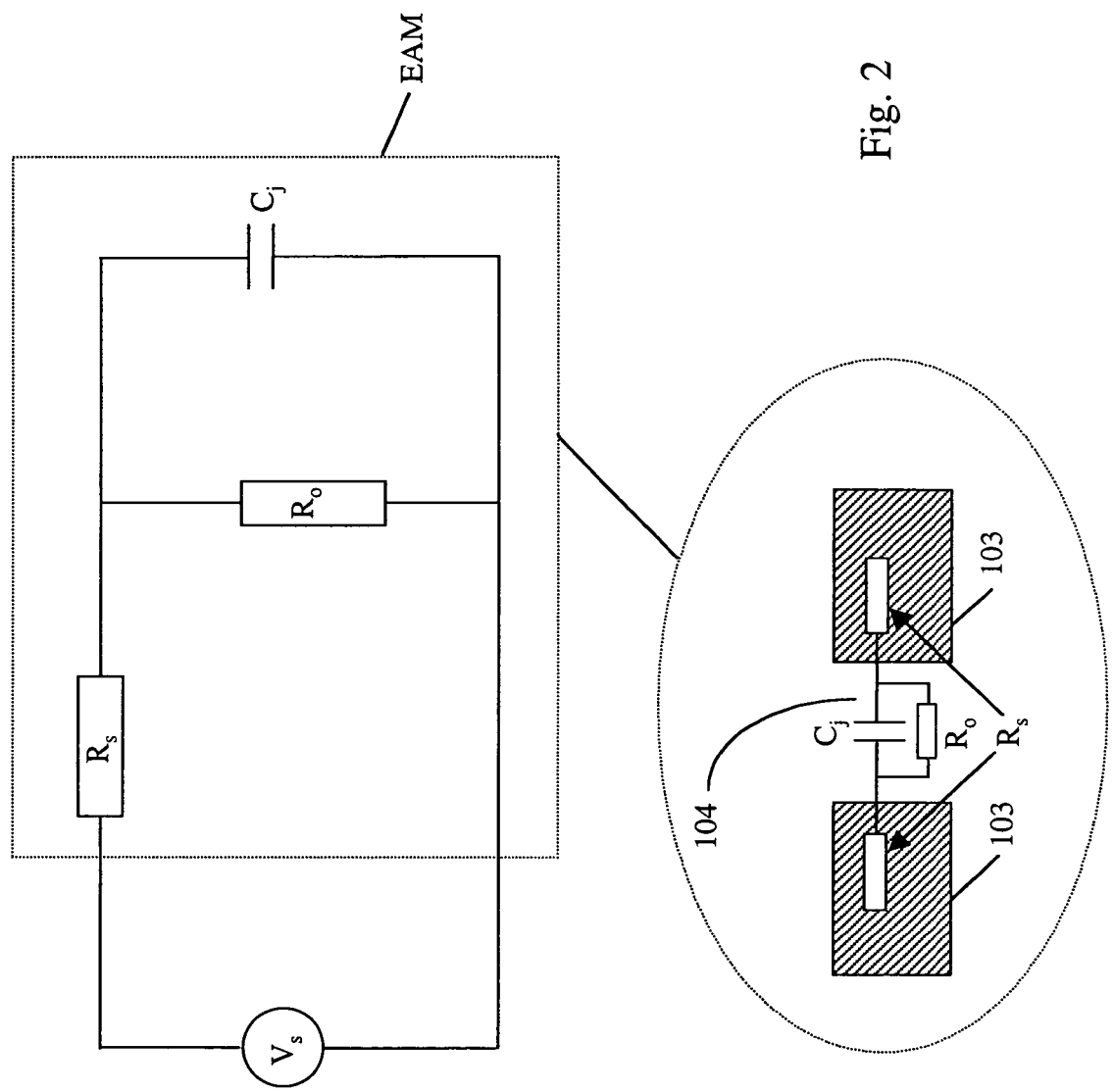
FIG. 2 shows a schematic of one optical modulator that can be used in the present invention.

Shown in FIG. 2 is a schematic model of an EAM. The amount of light absorbed by the EAM depends on the voltage of the RF output signal, the wavelength of the lightwave, the intensity of the lightwave, and the DC bias voltage applied to the EAM by the bias circuit 111. $V_s$ is used to model the voltage applied to the optical modulator 109 by the RF output signal. The effect of connecting the EAM to the broken loop resonator 103 can be analyzed by using the following simplifications. $R_s$, which is the series resistance of the EAM, is modeled by the characteristic impedance of the broken loop resonator 103. $C_j$ is modeled by the capacitance found in the gap 104 (This simplification assumes $C_j$ is much larger than the capacitance the gap 104 would have when the optical modulator 109 is not connected across it). When the optical modulator 109 absorbs the lightwave, a photocurrent is produced within the optical modulator 109 that acts as a shunting path for the current in the broken loop resonator 103. This phenomenon, modeled as $R_o$ in FIG. 1a, is generated across the gap 104. As a result, the width of the passband of the RF modulated lightwave is increased and the voltage enhancement is decreased as $R_o$ is increased. Simulations suggest that for a typical range of photocurrents produced, the passband can have a fractional 3 dB bandwidth and gain that ranges from 0.1% to 15% and from 20 dB to 3 dB, respectively. In addition, by adjusting the DC bias voltage using the bias circuit 111, the amount of light absorbed for a particular wavelength and intensity of the lightwave can be adjusted, thereby adjusting the value of $R_o$ and adjusting the passband of the RF modulated lightwave. Phase modulators and electro-optic type modulators can be modeled in the same way as the EAM shown in FIG. 2, except the resistance $R_o$ would be in the millions of Ohms, which is too high to allow adjustment of the passband. As such, an electrically controlled resistance could be placed in parallel with the resistance $R_o$.

Figure 3:
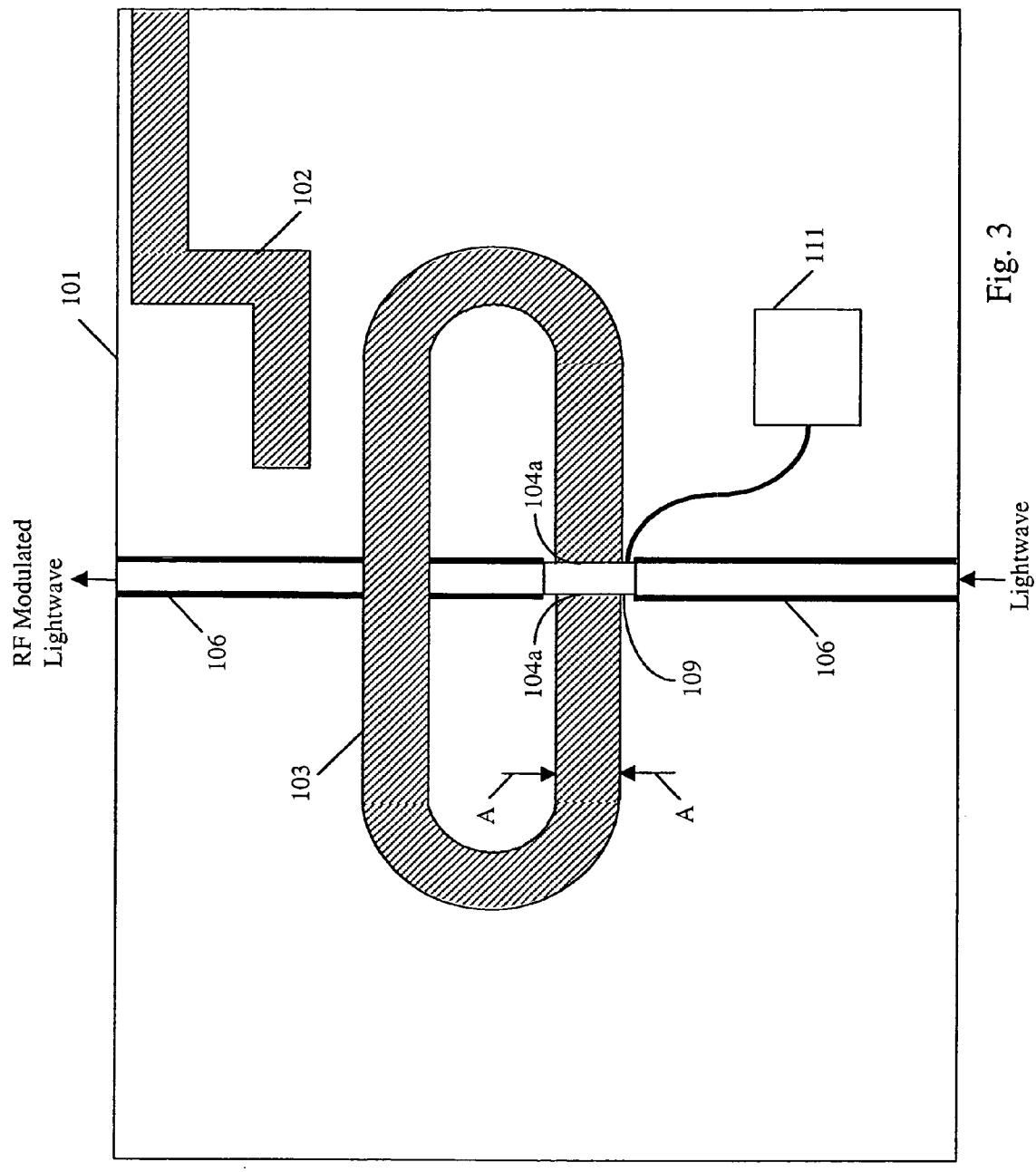
FIG. 3 shows the RF lightwave modulator of FIG. 1 except the optical modulator is connected directly to the broken loop resonator.

In a second embodiment of the present invention, it is possible to eliminate the need for electrical wires 105, as shown in FIG. 3. In such an embodiment, the optical modulator 109 is located in the gap 104 and the two electrodes of the optical modulator 103 are formed from the ends 104a of the broken loop resonator 103. Simulations indicate that in such an embodiment, when the broken loop resonator 103 has a transmission line width of about 200 micrometers, indicated by arrows A, the variation in voltage along the ends 104a of the broken loop resonator 103 contacting the optical modulator 109 is less than 5%. Also, the input 102 shown in FIG. 3 is positioned differently than the input 102 shown in FIG. 1. Adjusting the position of the input 102 does affect the performance of the RF-lightwave modulator 100, however, the position of the input 102 is purely a matter of design. The optical fiber 106 can also be located above the broken loop resonator 103, or beneath the broken loop resonator 103, as shown in FIG. 3.

Figure 4:
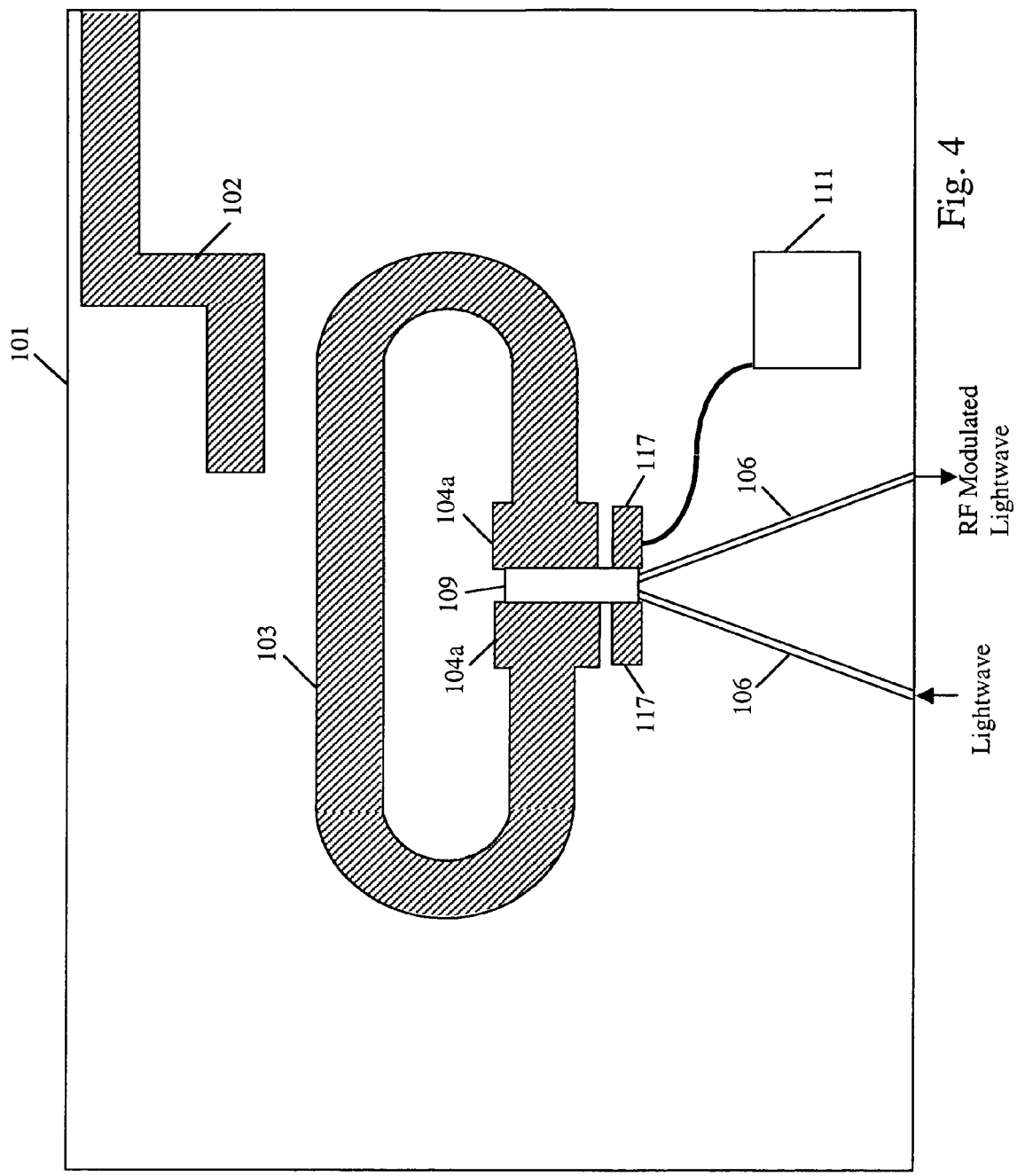
FIG. 4 shows a RF lightwave modulator using a reflective directional coupler modulator.

In a third embodiment of the present invention, a reflective directional coupler modulator, which is well known in the art, is used as the optical modulator 109, as shown in FIG. 4. In such an embodiment, the ends 104a of the broken loop resonator 103 are widened. However, the width of the ends 104a are still substantially smaller than the corresponding wavelength of the center frequency in the passband of the RF output signal. In such an embodiment, the optical modulator 109 is coupled directly to the ends 104a and preferably contains additional bias electrodes 117. The bias electrodes 117, well known in the art, are electrically coupled to the bias control circuit 111 and are used to adjust the modulation parameters of the optical modulator 109. In such an embodiment, the optical modulator and broken loop resonator 103 preferably comprise the same material, such as $LiNbO_3$. In addition, other optical modulators such as Mach-Zehnder interferometers or reflective Mach-Zender interferometers can be used equally as well in place of the reflective directional coupler modulator in this embodiment.

Figure 5:
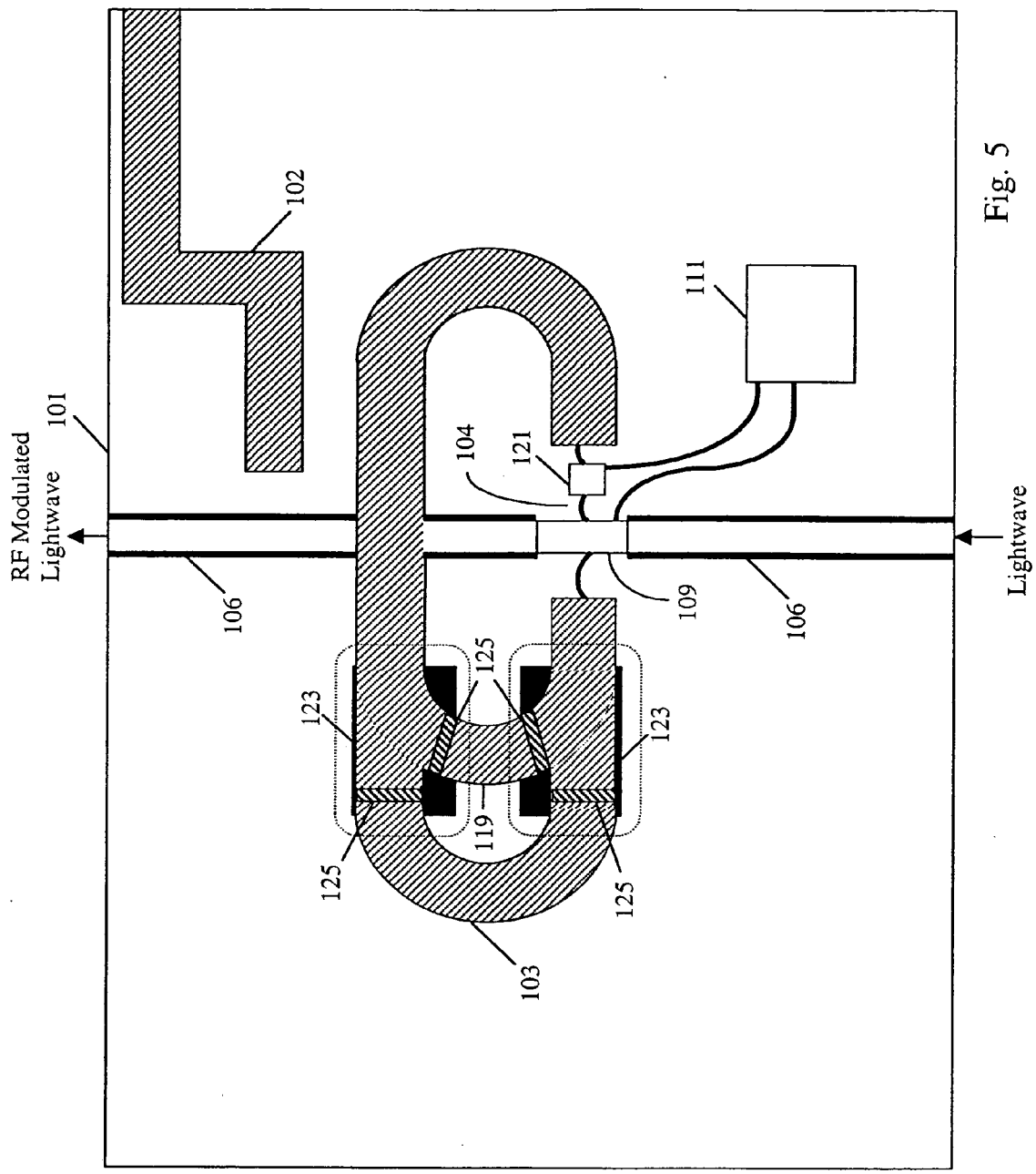
FIG. 5 shows a RF lightwave modulator making use of two nested loops in the broken loop resonator.

In a fourth embodiment of the present invention, shown in FIG. 5, the RF-lightwave modulator 100 may include an additional broken loop resonator 119 which is nested within the broken loop resonator 103. As can be seen in FIG. 5, the broken loop resonator 103 and additional broken loop resonator 119 have different dimensional parameters, specifically, they have different overall lengths. Because of their different dimensional parameters, the broken loop resonator 103 and additional broken loop resonator 119 each have distinct RF output frequencies and passbands when driven by a RF input signal on the input 102. The broken loop resonator 103 and additional broken loop resonator 119 each share the same gap 104 and are each connected to the same optical modulator 109. RF MEMS switches 123 can be used to switch activity between the broken loop resonator 103 and the additional broken loop resonator 119 by using two pairs of single-pole single throw switches 125, or a pair of single-pole double-throw switches (not shown) deposited on the resonators 103, 119. One reference that discusses a RF MEMS switch that could be used in this application is U.S. Pat. No. 6,440,767 to Loo et al.

A variable capacitor 121 may also be provided in the gap 104, as shown in FIG. 5. The variable capacitor 121 may be located in series with the optical modulator 109, as shown in FIG. 5, or may be located in parallel. The variable capacitor 121 is controlled by the bias control circuit 111 and is used to adjust the impedance of the gap 104. Implementation of the variable capacitor 121 could, for example, be done by mounting a separate varactor diode chip on the substrate 101. As previously discussed, the gap impedance of the resonators can be altered to adjust the center frequency of the passband of the RF modulated lightwave. If the capacitance of the variable capacitor 121 can be varied continuously, then the RF modulated lightwave can be tuned in discrete steps using the switches 125, and tuned continuously between those steps by using the variable capacitor 121. Also, those skilled in the art will realize that the variable capacitor 121 may be easily used in conjunction with the other embodiments disclosed herein.

Figure 6:
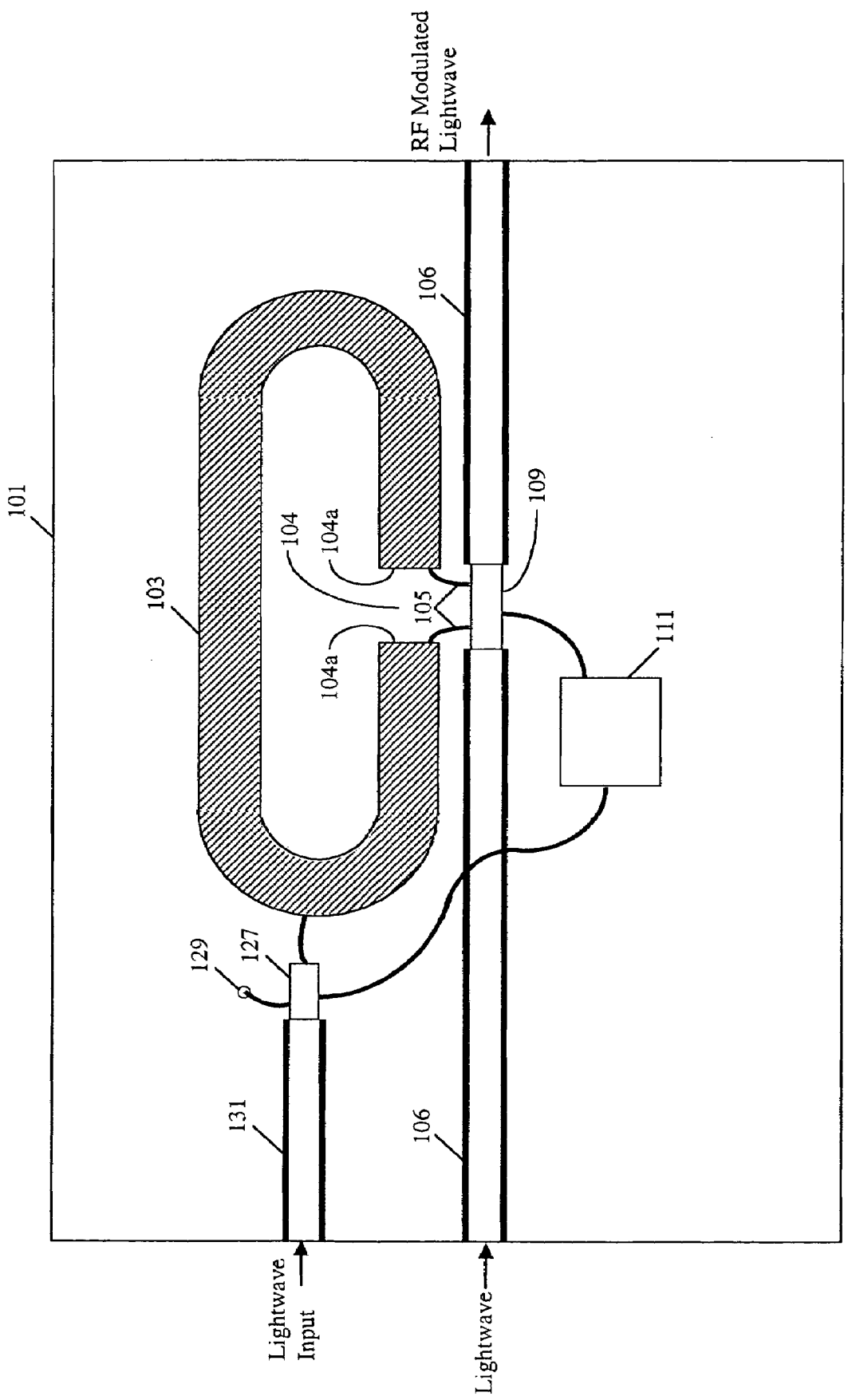
FIG. 6 shows a RF lightwave modulator which makes use of current coupling.

FIG. 6 depicts a fifth embodiment in which the RF input signal is coupled as a current into the broken loop resonator 103. In this embodiment, the RF-lightwave modulator can be used as a RF-lightwave repeater, or optical-wavelength-converting repeater. The RF-lightwave modulator shown in FIG. 6 is similar to the RF-lightwave modulator shown in FIG. 1 except the input 102 has been replaced with lightwave input 131 and a first photodetector 127. The first photodetector 127 is a two-terminal device such as, for example, a PIN diode. One contact of the first photodetector 127 is connected to the broken loop resonator 103 and the other contact is connected to a ground plane (not shown) through via 129. The first photodetector 127 receives a lightwave input signal, which is preferably RF-modulated, from lightwave input 131.

The lightwave input 131 preferably comprises optical fiber, however, the lightwave input signal may be coupled into the first photodetector 127 using optical lenses as previously discussed. Furthermore, the lightwave input signal may be coupled directly into the first photodetector 127 without the use of lightwave input 131. The lightwave input signal, could for example, be the RF modulated lightwave generated using the RF lightwave modulator 100 shown in FIG. 1. The first photodetector 127 converts the lightwave input signal into an electrical current (RF input signal) that is used to drive the broken loop resonator 103. If the lightwave input signal is not RF-modulated, it could comprise two or more optical frequencies. In this case, the multi-frequency lightwave input signal produces a RF signal by a heterodyning process at the photodetector 127. The broken loop resonator 103 produces a RF output signal that is coupled into the optical modulator using electrical wires 105. Of course, the optical modulator 109 could be coupled directly to the ends 104*a* of the broken loop resonator 103, as shown in FIG. 3.

The optical modulator 109 also receives a lightwave via optical fiber 106, which may or may not already be modulated. The lightwave is modulated with the RF output signal in the optical modulator 109, thereby producing a RF-modulated lightwave. When the RF-lightwave modulator 100 is used as an optical-wavelength-converting repeater as discussed above, the lightwave input and lightwave have different optical wavelengths, but the RF-modulated lightwave has substantially the same wavelength as the lightwave.

Figure 7:
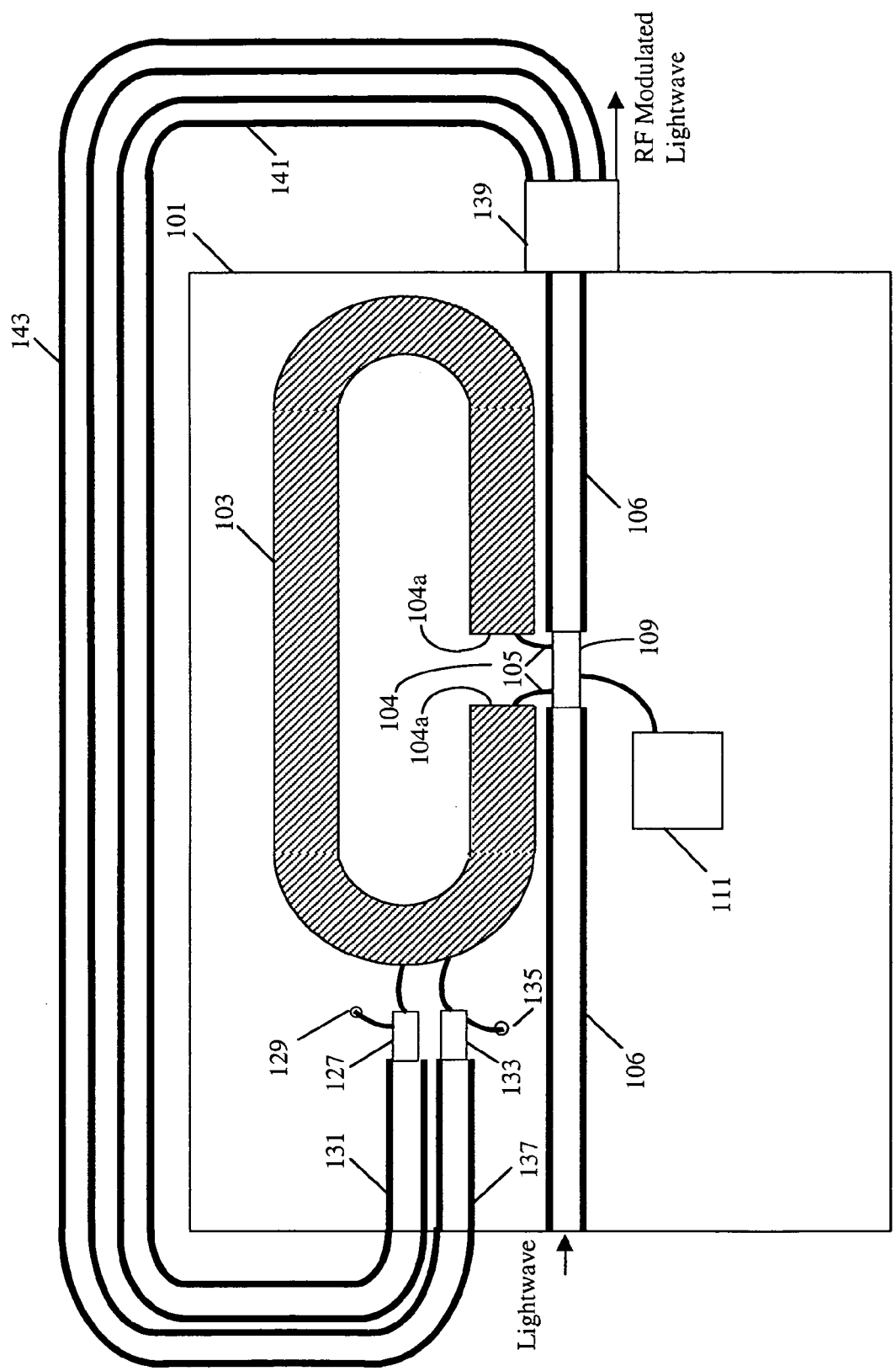
FIG. 7 shows a RF lightwave modulator that is used in a photonic oscillator.

In a sixth embodiment of the present invention, the RF-lightwave modulator, shown in FIG. 7, is used as part of a photonic oscillator. The photonic oscillator can be used to generate a RF signal having one or more frequencies. This sixth embodiment is similar to the embodiment shown in FIG. 5, but further includes an additional input 137, a second photodetector 133, optical splitter 139, first feedback loop 141, and second feedback loop 143. Like the first photodetector 127, the second photodetector 133 is a two-terminal device such as, for example, a PIN diode. One terminal of the second photodetector 133 is connected to the broken loop resonator 103 and the other terminal is connected to a ground plane (not shown) through via 135. The additional lightwave input 137 may comprise optical fiber or a series of optical lenses.

In this embodiment the RF-modulated lightwave is split into three signals at the optical splitter 139. As shown in FIG. 7, one of the signals from the optical splitter 139 is taken as the output, while the other two signals are coupled, via first and second feedback loops 141 and 143 back to lightwave inputs 131 and 137, respectively. Of course, it would be possible to couple RF modulated lightwaves on feedback loops 141 and 143 directly into photodetectors 127 and 133 without the use of lightwave inputs 131 and 137. The RF modulated lightwaves in the feedback loops 141, 143 enter lightwave inputs 131, 137. The first and second photodetectors 127, 133 convert the RF modulated lightwaves into electrical currents (RF input signal) to drive the broken loop resonator 103. The broken loop resonator 103 then produces a RF output that is coupled to the optical modulator 109 and used to modulate the lightwave on input 106.

The first and second feedback loops 141, 143, which comprise optical fiber, preferably have different lengths. As shown in FIG. 6, the second feedback loop 143 comprises a length of optical fiber which delays the time it takes the RF-modulated lightwave to reach lightwave input 137. The function of the first feedback loop 141 depends on whether the RF modulated lightwave comprises a single modulation frequency or multiple modulation frequencies. If the RF modulated lightwave comprises a single modulation frequency, then the first feedback loop 141 serves as a filter to limit the RF modulated lightwave to a single modulation frequency. If the RF modulated lightwave contains multiple modulation frequencies, then the first feedback loop 141 determines the spacing between the frequencies. Also, if the RF modulated lightwave contains multiple modulation frequencies, the passband of the RF lightwave modulator determines the bandwidth of the group of multiple frequencies, and thereby the number of frequencies in that group. Thus, it is obvious to those skilled in the art that the electrical parameters and physical parameters of the RF lightwave modulator can be adjusted to change the bandwidth of the group of multiple modulation frequencies or the number of frequencies in that group. The second feedback loop 143 is provided to reduce the phase noise of the RF signal in the RF modulated lightwave.

The RF signal in the RF modulated lightwave can be obtained by coupling the RF modulated lightwave into a photodetector (not shown) to produce an electrical signal. The RF signal can then be obtained directly from the electrical signal. Alternatively, an electrical tap (not shown), which is similar to the RF input 102 show in FIG. 1, may be connected to the broken loop resonator 103. The RF signal may then be obtained directly through the electrical tap.

Let it be understood that the foregoing description is only illustrative of the invention. Various alternatives and modifications can be devised by those skilled in the art without departing from the spirit of the invention. Accordingly, the present invention is intended to embrace all such alternatives, modifications, and variances which fall within the scope of the appended claims.

What is claimed is:

1. A RF-lightwave modulator comprising:
   a broken loop resonator, the broken loop resonator having a gap therein;
   an input providing an input signal to drive the broken loop resonator, the broken loop resonator generating an RF output signal in response thereof; and
   an optical modulator connected across the gap receiving the RF output signal, the optical modulator modulating a lightwave with the RF output signal to generate a RF-modulated lightwave;
   wherein the broken loop resonator comprises ends which define the gap, the ends providing the RF output signal for modulating the optical modulator, wherein the optical modulator is coupled to the ends with wires.

2. The RF-lightwave modulator of claim 1, wherein the optical modulator comprises a modulator selected from the group consisting of electroabsorption modulators, waveguide phase modulators, and electro-optic modulators.

3. The RF-lightwave modulator of claim 1, wherein the input comprises a member selected from the group consisting of RF transmission line and photodetectors.

4. The RF-lightwave modulator of claim 1, wherein the broken loop resonator is constructed from RF transmission line.

5. The RF-lightwave modulator of claim 3, wherein the input signal is a RF input signal, and wherein the input receives and provides the RF input signal when the input is constructed from RF transmission line.

6. The RF-lightwave modulator of claim 3, wherein the input signal is a RF input signal, and wherein the input receives a lightwave input signal comprising multiple frequencies when the input comprises the photodetector, the photodetector converting the lightwave input signal into the RF input signal.

7. The RF-lightwave modulator of claim 1, further comprising a bias control circuit coupled to the optical modulator for adjusting the passband of the RF-modulated lightwave.

8. The RF-lightwave modulator of claim 7, further comprising a variable capacitor coupled to the bias control circuit, optical modulator, and an edge of the broken loop resonator defining a portion of the gap, the variable capacitor adjusting the passband and center frequency of the RF-modulated lightwave.

9. The RF-lightwave modulator of claim 1, wherein the intensity of the RF output signal in the broken loop resonator is a maximum across the gap.

10. The RF-lightwave modulator of claim 1, wherein the input, broken loop resonator, and optical modulator are disposed on a substrate.

11. The RF-lightwave modulator of claim 1, wherein the optical modulator receives the lightwave via optical fiber.

12. The RF-lightwave modulator of claim 6, wherein the modulator is a RF-lightwave repeater.

13. The RF-lightwave modulator of claim 6, wherein the modulator is an optical-wavelength-converting repeater.

14. A RF-lightwave modulator comprising:
means for coupling an input signal into a broken loop resonator having a gap therein, the broken loop resonator producing a RF output signal in response thereof; and
means for modulating a lightwave with the RF output signal to produce a RF-modulated lightwave, wherein said means for modulating is connected across the gap;
wherein the broken loop resonator comprises ends which define the gap, the ends providing the RF output signal for modulating the optical modulator, wherein the means for modulating is coupled to the ends with wires.

15. The RF-lightwave modulator of claim 14, wherein the means for modulating comprises an optical modulator selected from the group consisting of electroabsorption modulators, waveguide phase modulators, and electro-optic modulators.

16. The RF-lightwave modulator of claim 14, wherein the means for coupling comprises a member selected from the group consisting of RF transmission line and photodetectors.

17. The RF-lightwave modulator of claim 14, wherein the broken loop resonator is constructed from RF transmission line.

18. The RF-lightwave modulator of claim 16, wherein the input signal is a RF input signal, and wherein the input receives and provides the RF input signal when the means for coupling comprises RF transmission line.

19. The RF-lightwave modulator of claim 16, wherein the input signal is a RF input signal, and wherein the means for coupling receives a lightwave input signal comprising multiple frequencies when the means for coupling comprises the photodetector, the photodetector converting the lightwave input signal into the RF input signal.

20. The RF-lightwave modulator of claim 14, further comprising a bias control circuit-coupled to the means for modulating for adjusting the passband of the RF-modulated lightwave.

21. The RF-lightwave modulator of claim 20, further comprising a variable capacitor coupled to the bias control circuit, the means for modulating, and an edge of the broken loop resonator defining a portion of the gap, the variable capacitor adjusting the passband and center frequency of the RF-modulated lightwave.

22. The RF-lightwave modulator of claim 14, wherein the intensity of the RF output signal in the broken loop resonator is a maximum across the gap.

23. The RF-lightwave modulator of claim 14, wherein the means for coupling, broken loop resonator, and the means for modulating are disposed on a substrate.

24. The RF-lightwave modulator of claim 14, wherein the means for modulating receives the lightwave via optical fiber.

25. The RF-lightwave modulator of claim 19, wherein the modulator is a RF-lightwave repeater.

26. The RF-lightwave modulator of claim 19, wherein the modulator is an optical-wavelength-converting repeater.

27. A method for generating a RF-modulated lightwave comprising;
driving a broken loop resonator having a gap therein with an RF input signal, the broken loop resonator generating an RF output signal in response thereof;
modulating a lightwave with the RF output signal to generate the RF-modulated lightwave, the RF output signal being taken from the broken ioop resonator across the gap; and
adjusting the intensity or wavelength of the lightwave to adjust the passband of the RF-modulated lightwave.

28. The method of claim 27, further comprising the step of adjusting the impedance of the gap to adjust the passband and center frequency of the RF-modulated lightwave.

29. The method of claim 27, further comprising the step of adjusting the thickness or attenuation of the broken loop resonator to adjust the ratio of RF to DC components in the RF-modulated lightwave.

30. A RF-lightwave modulator comprising:
a broken loop resonator, the broken loop resonator having a gap therein;
an input providing an input signal to drive the broken loop resonator, the broken loop resonator generating an RF output signal in response thereof;
an optical modulator connected across the gap receiving the RF output signal, the optical modulator modulating a lightwave with the RF output signal to generate a RF-modulated lightwave; and
a bias control circuit coupled to the optical modulator for adjusting the passband of the RF-modulated lightwave.

31. The RF-lightwave modulator of claim 30, wherein the optical modulator comprises a modulator selected from the group consisting of electroabsorption modulators, waveguide phase modulators, and electro-optic modulators.

32. The RF-lightwave modulator of claim 30, wherein the input comprises a member selected from the group consisting of RF transmission line and photodetectors.

33. The RF-lightwave modulator of claim 30, wherein the broken loop resonator is constructed from RF transmission line.

34. The RF-lightwave modulator of claim 32, wherein the input signal is a RF input signal, and wherein the input receives and provides the RF input signal when the input is constructed from RF transmission line.

35. The RF-lightwave modulator of claim 32, wherein the input signal is a RF input signal, and wherein the input receives a lightwave input signal comprising multiple frequencies when the input comprises the photodetector, the photodetector converting the lightwave input signal into the RF input signal.

36. The RF-lightwave modulator of claim 30, wherein the broken loop resonator comprises ends which define the gap, the ends providing the RF output signal for modulating the optical modulator, wherein the optical modulator is coupled to the ends with wires.

37. The RF-lightwave modulator of claim 30, wherein the broken loop resonator comprises ends which define the gap, the ends serving as electrodes for the optical modulator, wherein the optical modulator is coupled directly to the ends.

38. The RF-lightwave modulator of claim 30, further comprising a variable capacitor coupled to the bias control circuit, optical modulator, and an edge of the broken loop resonator defining a portion of the gap, the variable capacitor adjusting the passband and center frequency of the RF-modulated lightwave.

39. The RF-lightwave modulator of claim 30, wherein the intensity of the RF output signal in the broken loop resonator is a maximum across the gap.

40. The RF-lightwave modulator of claim 30, wherein the input, broken loop resonator, and optical modulator are disposed on a substrate.

41. The RF-lightwave modulator of claim 30, wherein the optical modulator receives the lightwave via optical fiber.

42. The RF-lightwave modulator of claim 35, wherein the modulator is a RF-lightwave repeater.

43. The RF-lightwave modulator of claim 35, wherein the modulator is an optical-wavelength-converting repeater.

44. A RF-lightwave modulator comprising:
    means for coupling an input signal into a broken loop resonator having a gap therein, the broken loop resonator producing a RF output signal in response thereof;
    means for modulating a lightwave with the RF output signal to produce a RF-modulated lightwave, wherein said means for modulating is connected across the gap; and
    a bias control circuit coupled to the means for modulating for adjusting the passband of the RF-modulated lightwave.

45. The RF-lightwave modulator of claim 44, wherein the means for modulating comprises an optical modulator selected from the group consisting of electroabsorption modulators, waveguide phase modulators, and electro-optic modulators.

46. The RF-lightwave modulator of claim 44, wherein the means for coupling comprises a member selected from the group consisting of RF transmission line and photodetectors.

47. The RF-lightwave modulator of claim 44, wherein the broken loop resonator is constructed from RF transmission line.

48. The RF-lightwave modulator of claim 46, wherein the input signal is a RF input signal, and wherein the input receives and provides the RF input signal when the means for coupling comprises RF transmission line.

49. The RF-lightwave modulator of claim 46, wherein the input signal is a RF input signal, and wherein the means for coupling receives a lightwave input signal comprising multiple frequencies when the means for coupling comprises the photodetector, the photodetector converting the lightwave input signal into the RF input signal.

50. The RF-lightwave modulator of claim 44, wherein the means for modulating comprises ends which define the gap, the ends providing the RF output signal for modulating the optical modulator, wherein the means for modulating is coupled to the ends with wires.

51. The RF-lightwave modulator of claim 44, wherein the means for modulating comprises ends which define the gap, the ends serving as electrodes for the means for modulating, wherein the means for modulating is coupled directly to the ends.

52. The RF-lightwave modulator of claim 44, further comprising a variable capacitor coupled to the bias control circuit, the means for modulating, and an edge of the broken loop resonator defining a portion of the gap, the variable capacitor adjusting the passband and center frequency of the RF-modulated lightwave.

53. The RF-lightwave modulator of claim 44, wherein the intensity of the RF output signal in the broken loop resonator is a maximum across the gap.

54. The RF-lightwave modulator of claim 44, wherein the means for coupling, broken loop resonator, and the means for modulating are disposed on a substrate.

55. The RF-lightwave modulator of claim 44, wherein the means for modulating receives the lightwave via optical fiber.

56. The RF-lightwave modulator of claim 49, wherein the modulator is a RF-lightwave repeater.

57. The RF-lightwave modulator of claim 49, wherein the modulator is an optical-wavelength-converting repeater.

58. A method for generating a RF-modulated lightwave comprising:
    driving a broken loop resonator having a gap therein with an RF input signal, the broken loop resonator generating an RF output signal in response thereof
    modulating a lightwave with the RF output signal to generate the RF-modulated lightwave, the RF output signal being taken from the broken loop resonator across the gap; and
    adjusting the impedance of the gap to adjust the passband and center frequency of the RF-modulated lightwave.

59. The method of claim 58 further comprising the step of adjusting the intensity or wavelength of the lightwave to adjust the passband of the RF-modulated lightwave.

60. The method of claim 58, further comprising the step of adjusting the thickness or attenuation of the broken loop resonator to adjust the ratio of RF to DC components in the RF-modulated lightwave.

61. A method for generating a RF-modulated lightwave comprising:
    driving a broken loop resonator having a gap therein with an RF input signal, the broken loop resonator generating an RF output signal in response thereof;
    modulating a lightwave with the RF output signal to generate the RF-modulated lightwave, the RF output signal being taken from the broken loop resonator across the gap; and
    adjusting the thickness or attenuation of the broken ioop resonator to adjust the ratio of RF to DC components in the RF-modulated lightwave.

62. The method of claim 61 further comprising the step of adjusting the intensity or wavelength of the lightwave to adjust the passband of the RF-modulated lightwave.

63. The method of claim 61, further comprising the step of adjusting the impedance of the gap to adjust the passband and center frequency of the RF-modulated lightwave.

* * * * *